(12) United States Patent
du Buis et al.

(10) Patent No.: US 10,621,925 B1
(45) Date of Patent: Apr. 14, 2020

(54) METHOD OF ENHANCING THE VISIBILITY OF SCREEN IMAGES

(71) Applicants: Stephen E. du Buis, Wimauma, FL (US); David Bailey, Riverview, FL (US)

(72) Inventors: Stephen E. du Buis, Wimauma, FL (US); David Bailey, Riverview, FL (US)

(73) Assignee: JL Marine Systems, Inc., Tampa, FL (US)

( * ) Notice: Subject to any disclaimer, the term of this patent is extended or adjusted under 35 U.S.C. 154(b) by 0 days.

(21) Appl. No.: 15/330,246

(22) Filed: Aug. 29, 2016

Related U.S. Application Data

(60) Provisional application No. 62/283,421, filed on Aug. 31, 2015.

(51) Int. Cl.
*G09G 3/34* (2006.01)
*G06T 5/00* (2006.01)
*G06T 5/40* (2006.01)

(52) U.S. Cl.
CPC .......... *G09G 3/3406* (2013.01); *G06T 5/009* (2013.01); *G06T 5/40* (2013.01); *G06T 2207/10024* (2013.01); *G06T 2207/20072* (2013.01); *G06T 2207/20208* (2013.01); *G09G 2320/0276* (2013.01); *G09G 2320/066* (2013.01); *G09G 2320/0626* (2013.01); *G09G 2320/0633* (2013.01); *G09G 2360/144* (2013.01); *G09G 2360/16* (2013.01)

(58) Field of Classification Search
None
See application file for complete search history.

(56) References Cited

U.S. PATENT DOCUMENTS

| 7,995,116 | B2 * | 8/2011 | Pillman | H04N 5/232 |
| | | | | 348/229.1 |
| 8,203,579 | B2 * | 6/2012 | Kerofsky | G09G 3/3406 |
| | | | | 345/102 |
| 2012/0092393 | A1 * | 4/2012 | Lu | H04N 5/58 |
| | | | | 345/690 |

OTHER PUBLICATIONS

Cheng et al., Color Image Segmentation: Advances & Prospects, Dec. 2001, Pattern Recognition, vol. 34, Issue 12, pp. 1-43.*

* cited by examiner

Primary Examiner — Matthew Salvucci

(57) ABSTRACT

A method and system for enhancing the visibility of screen images in a high ambient light condition or environment by processing the object images comprising a first stage to increase the brightness of transmission light from the backlight of an LCD screen and a second stage to further enhance the brightness as well as the contrast of the images to be displayed.

16 Claims, 25 Drawing Sheets

METHOD OF ENHANCING THE VISIBILITY OF SCREEN IMAGES

CROSS REFERENCE

This utility application claims priority of provisional application Ser. No. 62/283,421, filed Aug. 31, 2015.

BACKGROUND OF THE INVENTION

Field of the Invention

A seamless two-stage method of enhancing the image displayed on an LCD screen in a high ambient light condition or environment.

Description of the Prior Art

Information displays are generally difficult to view or distinguish in direct sunlight or other high ambient light conditions due to insufficient emitted light and contrast.

Image enhancement is widely used in a wide array of endeavors such as medical image analysis, remote sensing, industrial X-ray image processing and microscopic imaging. Image enhancement is employed to improve the visual effects and the clarity of images for more effective results.

Contrast enhancement is one of the commonly used image enhancement methods. Many methods for image contrast enhancement have been published and are widely known. One of the most common techniques is histogram equalization. The fundamental principle of histogram equalization is to process the image such that the enhanced image has an approximately uniform histogram distribution resulting in the dynamic range of the image being fully exploited. This process can enhance the visibility of imagery. However, these techniques are not suitable for all images causing several problems such as:

- lack of an adjustment mechanism to control the level of enhancement or make a satisfying balance on the details between the bright and dark portions or segments of the image,
- over enhance or generate excessive noise in the image, or dramatically change the average brightness of the image in a way that reduces visibility under high ambient light conditions.

Another technique to improve the viewing of images in high ambient light when the display's inherent visual power is inadequate for the conditions is to increase brightness globally throughout the image by applying an image filter or through hardware means on the display itself. In transmissive type LCD displays, this results in a generalized increase in the transparency of the liquid crystals allowing more of the display's backlighting to pass through to the viewer. Under some conditions this process may enhance the visibility of imagery. However, this technique is not suitable for all images causing problems, primarily because the technique introduces a reduction of dynamic range in the image leading to low contrast in a way that is contrary to the goal of enhancing the visibility of detail.

In order to overcome these short comings an adaptive image processing is employed by this invention to automatically adjust a tonality transformation of the image according to an analysis of the object image's histogram.

Examples of the prior art are found in the following references;

"A New Enhancement Approach for Enhancing Image of Digital Cameras by Changing Contract" International Journal of Advanced Science and Technology—Vol. 32, July, 2011 http://www.sersc.org/journals/IJAST/vol32/2.pdf "An Adaptive Image Enhancement Technique Preserving Brightness Level Using Gamma Correction" Advance in Electronic and Electric Engineering. ISSN 2231-1297, Volume 3, Number 9 (2013), pp. 1097-1108 http://www.ripublication.com/aeee/060_pp%201097-1108.pdf "A Novel Method for the Contrast Enhancement of Fog Degraded Video Sequences" International Journal of Computer Applications (0975-8887) Volume 54—No. 13, September 2012 http://research.ijcaonline.org/volume54/number13/pxc3882489.pdf "System and method for enhancing low-visibility imagery" Publication U.S. Pat. No. 8,023,760 B1 Sep. 20, 2011—Assignee: US Navy http://www.google.com/patents/US8023760

"Adaptive linear contrast method for enhancement of low-visibility imagery" Publication U.S. Pat. No. 8,149,245 B1 Apr. 3, 2012—Assignee: US Navy https://www.google.com/patents/US8149245

"Image Processing for Human Understanding in Low-visibility" Mark A. Livingston, Caelan R. Garrett, and Zhuming Ai—Naval Research Laboratory http://web.mit.edu/caelan/www/publications/hsis2011.pdf Adobe Photoshop, a well-known and powerful image editing tool, has a full suite of image processing filters. Included is a tool, they call "Curves" for transforming brightness and is presented to the user in a similar manner, with histogram and transformation function graph, as shown in this invention discloser. Photoshop features an "Auto" function that manipulates the transformation function to enhance the image.

In review, each of these processes or techniques has some similarities in that they are adaptive but none process images in the manner of the present invention or any possess the range of adaption necessary for presenting a wide variety of imagery with useful detail, particularly in high ambient light conditions.

SUMMARY OF THE INVENTION

The present invention relates to a method and system for enhancing the visibility of object images that may otherwise be unsuitable for display given the image's points of interest and the viewing conditions thereby enhancing the process of extracting and presenting useful information.

The image enhancement of the present system adaptively enhances the visibility of low contrast and/or low brightness images. The system processes an input image so that the resultant image is more suitable than the original image for a specific application such as the viewing of pertinent details of low visibility images in a high ambient light environment. Instead of simply making the back-light brighter, the present invention transforms images to allow sufficient transmissive light through the assembly from the back-light as well of enhancing viewability by increasing contrast for sunlight viewing.

In particular, the present invention relates to:

A method of enhancing the viewing of display screens by altering the image to allow improved image discrimination in high ambient light.

A method of enhancing the viewing of display screens in sunlight by altering the image to allow more backlight through the display structure.

Image processing to analyze display images and selectively convert colors to provide more total light out of the display while producing high image contrast.

Image processing to analyze the image and to convert colors with similar appearance to colors more distinct, producing high contrast and overall providing maximum light flux.

Image processing to analyze the image and to convert display pixels with a contrast separation with respect to the entire image altering the image to allow improved readability in high ambient light.

Image processing that analyzes display graphics to transform image selective colors to high transparency colors with respect to the native colors maximizing contrast allowing for increased overall light out of the LCD while providing high contrast of the image.

Image processing that analyzes display graphics to transform selective low transparency image colors to high transparency colors in an amount of color shift proportional to the native image transmissive merit and maximizing contrast allowing for increased light out and readability of the display.

Image processing to analyze the image and alter the chromaticity to allow more light intensity out of the LCD.

A method of enhancing the viewing of LCD screens in sunlight by altering the image to allow more backlight through the display structure and process modifies colors for significant contrast combined with scaling of back light to provide optimal viewing.

A method of converting a display image to allow backlight transmitted through a display proportional to the amount of ambient sun light.

A method of converting a display image to allow backlight transmitted through a display and color shifts providing significant contrast proportional to the amount of ambient sun light.

An apparatus where the degree of brightening and contrast enhancement is proportional to difference in the native image transmissive characteristics and display's ambient light.

An apparatus with light sensor and display that proportionally enhances the display's readability as a function of exposure to ambient light.

An apparatus with light sensor and display that proportionally varies image processing software to enhance display's readability as a function of exposure to ambient light.

An apparatus provides user controls to selectively enable image enhancement processing software to enhance display's high ambient light readability.

The adaptive transformation of image tonality employed by this invention selectively increases contrast, brightness and color saturation in such a way as to mimic increased display power. Displays, such as those found on most smart phones, tablets, computers, televisions, marine and avionics instrumentations, have a finite amount of display brightness and contrast. This invention may be applied to effectively extend display power well beyond the physical limitations of the display. For instance, by coupling the ambient light sensor signal used to adjust the backlighting of a LCD screen to this invention, it is possible to vary this invention's image processing strength to the effect of seamlessly increasing visibility of the display after the backlighting of the device has reached its maximum.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE INVENTION

The present invention relates to a seamless image processing method and system to adaptively increase the visibility of details in low contrast and/or low brightness images and to boost the visual clarity in otherwise inadequate images when shown on underpowered displays and/or high ambient light conditions in a way that mimics increased display power.

Figure 1:
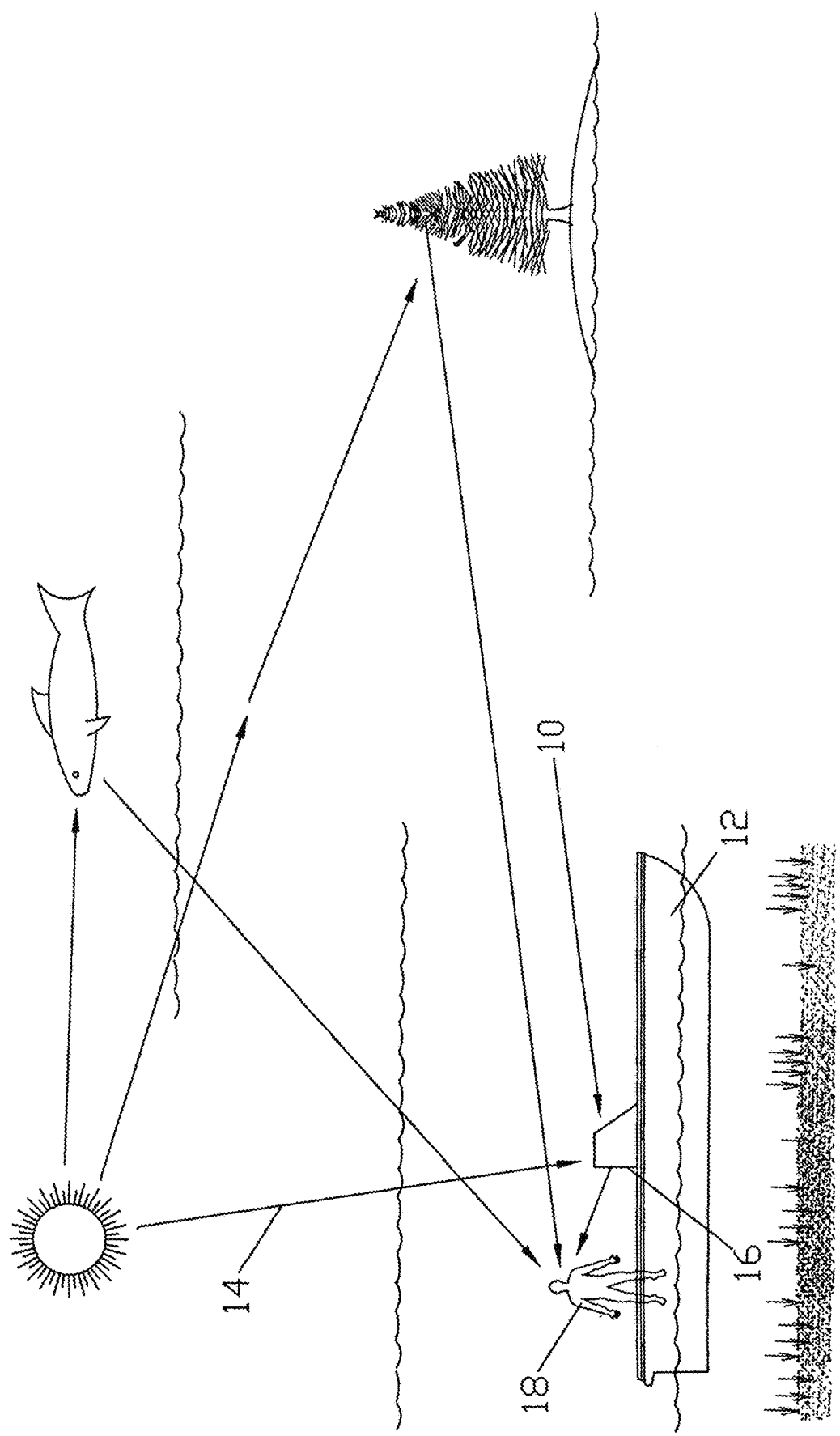
FIG. 1 is a graphic depiction of an LCD display console in a high ambient light environment.

FIG. 1 depicts a display console generally indicated as 10 for use on a boat 12 such as when sounding for fish 13. Normally, the reflection of the sun's rays 14 off the console 10 degrades the display images 16 to the point that a person 18 cannot discern or discriminate the images generated by the console 10. Thus, the first stage of seamless system of the present invention comprises enhancing the display screen to allow more backlight through the display structure.

Figure 2:
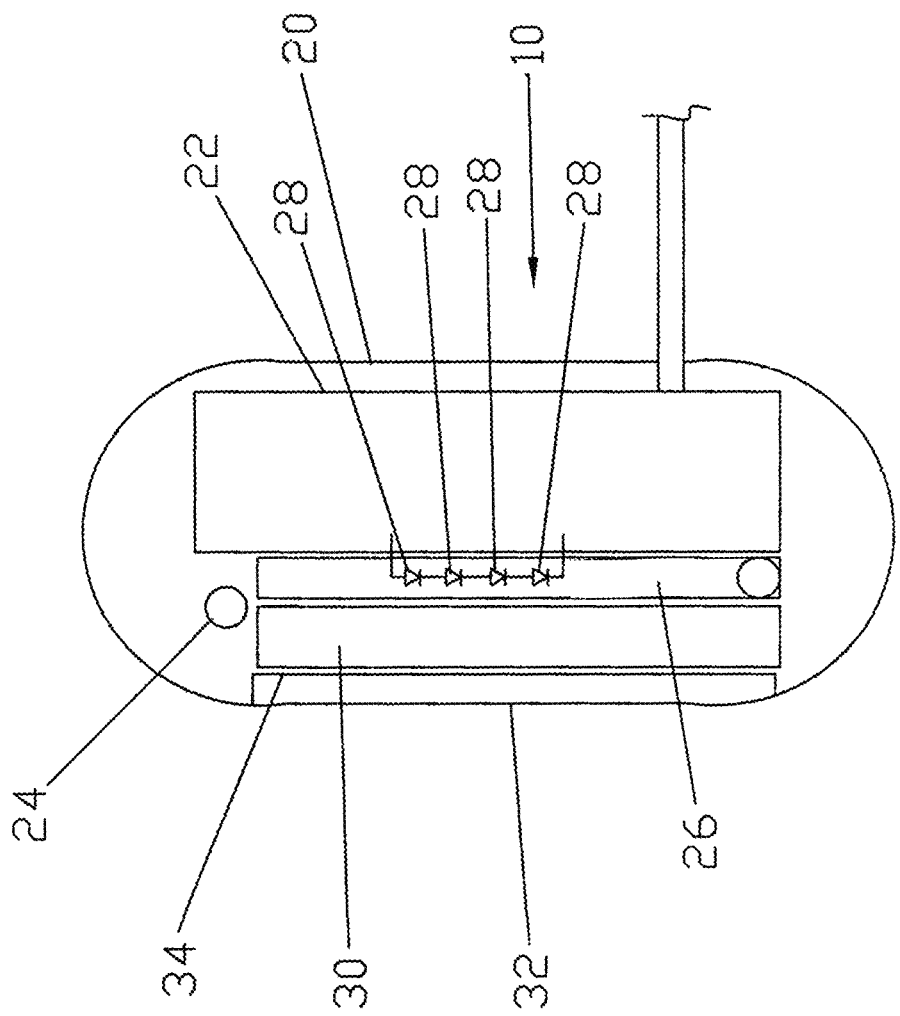
FIG. 2 is a cross-sectional view of the LCD console of the present invention.

FIG. 2 depicts an LCD display console 10 in a high ambient light condition. LCD screens may be constructed with transmissive, reflective or combination for lighting the display. Transmissive back-light of LCD is most common and LEDs or florescent emitters generate light that is selectively projected through the LCD structure. Some applications display images that block nearly all the LCD's transmissive back-light and usually provide little constast.

In particular, the console 10 comprises an enclosure 20 to house an electronics assembly including a micro-controller and circuitry 22 coupled to an external power and data source (not shown) and to an ambient light sensor 24 and back-light 26 comprising a plurality of LEDs each indicated as 28. Also housed within the enclosure 20 is an LCD display 30 disposed to receive the light emitted from the LEDs 28 and a protective transparent panel or cover of glass 32. A touch screen 34 may be operatively disposed between the LCD display 30 and the protective transparent panel or cover glass 32.

The apparatus shown in FIG. 2 includes logic and state of the art processing and control capabilities of proportionally enhancing the display's readability as a function of exposure to ambient light, of proportionally varying image processing to enhance display's readability as a function of exposure to ambient light and to selectively enable image enhancement processing to enhance display's high ambient light readability.

Figure 3:
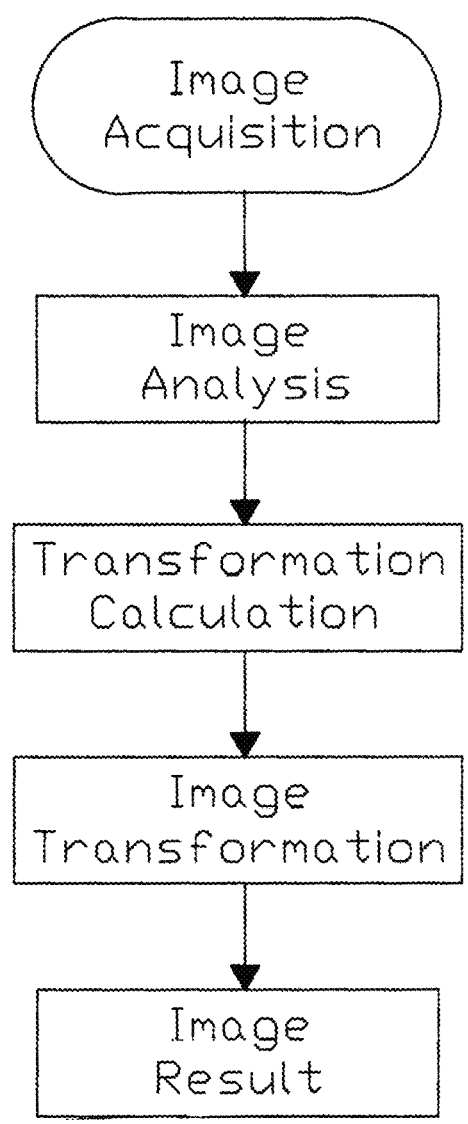
FIG. 3 is a flow diagram of the image analysis, transformation calculation and image transformation process steps of the present invention.

The second stage of the seamless image processing system of the present invention comprises a method having the plurality of steps including image analysis, transformation calculation and image transformation as depicted in a high-level view by FIG. 3.

Image Analysis Step

The image analysis step involves the derivation of several characteristics of the object image. The image analysis may be performed on a pixel-by-pixel basis of the object image or, optionally, sampled more sparsely. Image characteristics derived are:

image grey scale values include brightness, perceived brightness and luminance;
image grey scale frequency histogram;
image average brightness, and Image Range of Brightness Image Grey Scale Values Grey scale values for each pixel of the object image are calculated using one of many commonly known methods. For example:

Numerical Brightness: I=(R+G+B)/3 where R, G and B represent the values of the intensity of the colors; Red, Green, and Blue of the pixel and I represent brightness as the numerical average of the three colors. This type of calculation is used in the image processing examples that follow.

Perceived Brightness: I=0.299×R+0.587×G+0.114×B where R, G and B represent the values of the intensity of the colors; Red, Green, and Blue of the pixel and I represent brightness as the human perceptually weighted average of the three colors.

Luminance: Involves a method of transforming RGB values into Hue, Saturation, and Lightness (HSL) values using L as the gray scale value such that I=L.

Other state of the art techniques may be employed.

Image Grey Scale Frequency Histogram

The grey scale frequency histogram is a statistical representation of the distribution of grey scale values found in the object image. It is a representation of how many of the pixels or sample points fall into a range of predefined values called bins. As the image is scanned each sample point's grey value increments the appropriate accumulator resulting in a depiction of how many sample point grey values where found in the range of each bin. In the image processing examples to follow 256 bins are used in the histogram where 0 represents no brightness (black) and 255 represents maximum brightness (white).

Pseudocode for Grey Scale Histogram using Numerical Brightness and 256 bins on a 24-bit depth image:

```
array histogramBin[256]
    for j=0 to imageWidth {
        for k=0 to imageHeight {
            brightness=(pixel[j,k]·red+pixel[j,k]·green+pixel[j,k]·blue)/3
            histogramBin[brightness]=histogramBin[brightness]+1
```

Image Average Brightness

The average brightness is calculated by converting each of the target image pixel values to grey scale brightness and calculating the arithmetic mean.

Pseudocode for Average Brightness using Numerical Brightness and Arithmetic Mean:

```
accumulatedBrightness=0
for j=0 to imageWidth
    for k=0 to imageHeight
        accumulatedBrightness=accumulatedBrightness+
            (pixel[j,k]·red+pixel[j,k]·green+pixel[j,k]·blue)/3}
result=accumulatedBrightness/
    (imageWidth*imageHeight)
```

Image Range of Brightness

The range of brightness is defined by this invention as a measure of brightness extremes found in the image. Continuing with the example of a 24-bit image depth and an 8-bit valuation ranging from 0-255; 0 representing no range; i.e. all pixels are the same brightness, whereas, 255 represents that the full dynamic range of brightness is expressed by the object image.

The simplest means of calculating this is to scan thought each pixel, converting to brightness, and recording the lowest brightness pixel and the highest brightness pixel value found and then taking the difference.

Pseudocode for Simple Range of Brightness:

```
array brighness[imageWidth, imageHeight
minBrighness=255
maxBrightness=0
for j=0 to imageWidth
    for k=0 to imageHeight
        brighness[j,k]=(pixel[j,k]·red+pixel[j,k]·green+pixel[j,k]·blue)/3
        if    brighness[j,k]>maxBrightness    then
            maxBrightness=brightness[j,k]
        if    brighness[j,k]<minBrightness    then
            minBrightness=brightness[j,k]
result=maxBrightness−minBrightness
```

A major drawback of Simple Range of Brightness is that if the image has the majority of its pixels in a narrow range of brightness and just a few pixels at the extremes (in this case it only takes one pixel) the resulting range value is not representative of the image as a whole.

To overcome this limitation many modifications are available, such as:

Using a threshold such that the range values are calculated from pixels that occur a certain minimum number of times in the image.

Dividing the pixels into two groups those of greater brightness than the Image Average Brightness and those of lesser brightness then using the average brightness of each of the two groups as the minimum and maximum values.

The first method reduces the drawback of Simple Range of Brightness but it relies on the careful selection of the threshold value to get optimal performance and there is no value that is best for all images.

The second method is preferred because it does not rely on any arbitrary threshold value.

Pseudocode for Divided Range of Brightness:

```
accumMin=0, countMin=0, accumMax=0, countMax=0
for j=0 to imageWidth {
    for k=0 to imageHeight
        if brightness[j,k]<averageBrightness then
            accumMin=accumMin+brightness[j,k]
            countMin=countMin+1
        else if brightness[j,k]>averageBrightness then
            accumMax=accumMax+brightness[j,k]
            countMax=countMax+1}
    if countMax>0 and countMin>0 then
        result=accumMax/countMax−accumMin/countMin
    else
        result=0
```

Transformation Calculation Step

Figure 4:
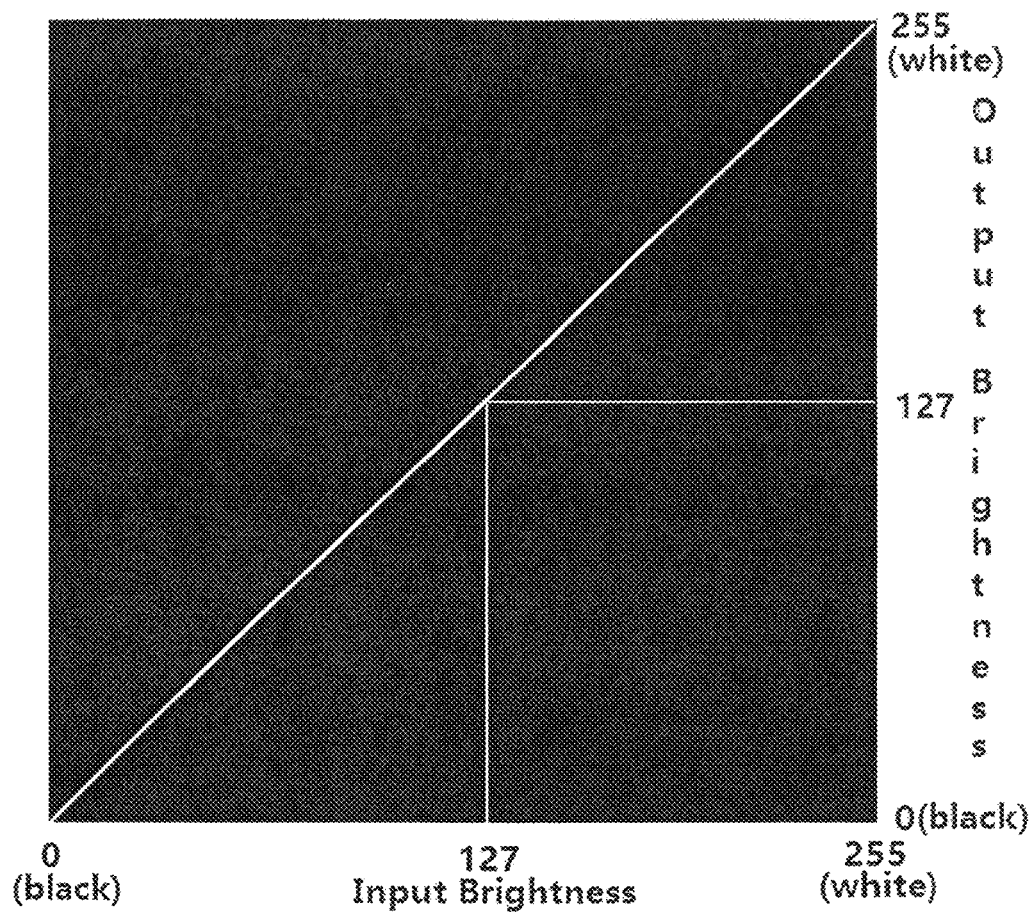
FIG. 4 is a graphical depiction of a neutral transformation calculation of the present invention.

The invention's image process involves processing the object image according to a transformation function that maps image tonality adjustments. This transformation can be visualized in graph form as a line that expresses the input and output values of the function. When the function is at unity its input value are the output values and the transformation is neutral in that no image modification occurs as FIG. 4.

Performing a neutral transformation on image brightness has no effect. Each pixel's input brightness maps to the same output brightness value (exp. input 127 results in output 127.)

Figure 5:
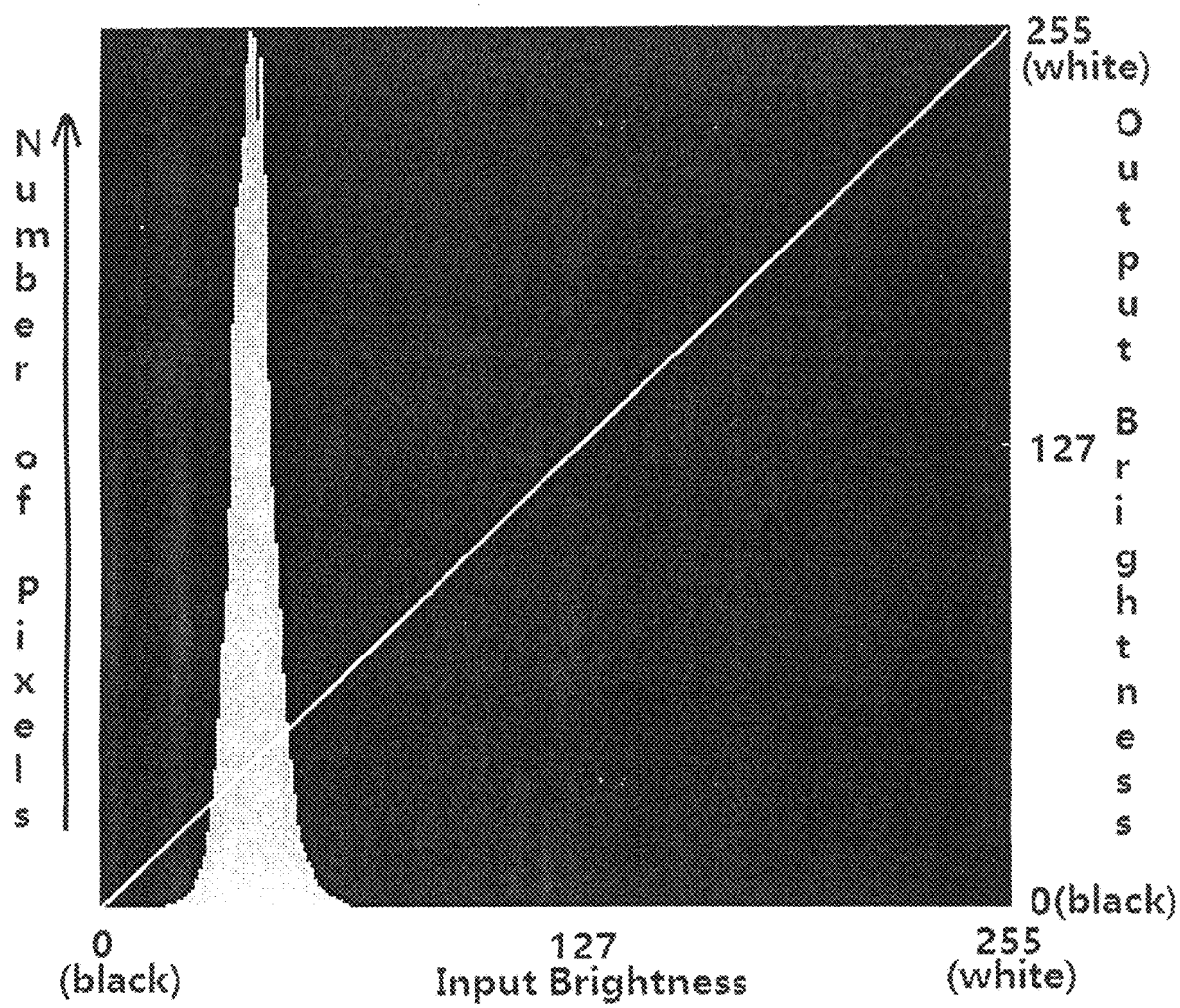
FIG. 5 is a graphic depiction of a histogram calculation of the present invention.

The focus of this invention involves automatically modifying this transformation curve to maximize detail in the brightness regions that contain the majority of detail while maintaining the full dynamic range of the image; i.e. black remains black and white remains white. Maximum detail is realized by insuring the slope of the transformation curve is steep through the regions of highest histogramic brightness frequency density. This is accomplished by integrating the histogram and normalizing the resultant values to the brightness transformation range, in this example 0 to 255. FIG. 5 shows an example of a low brightness, low contrast image histogram that typically is very difficult to obtain useful information particularly when viewed in a high ambient light environment.

Figure 6:
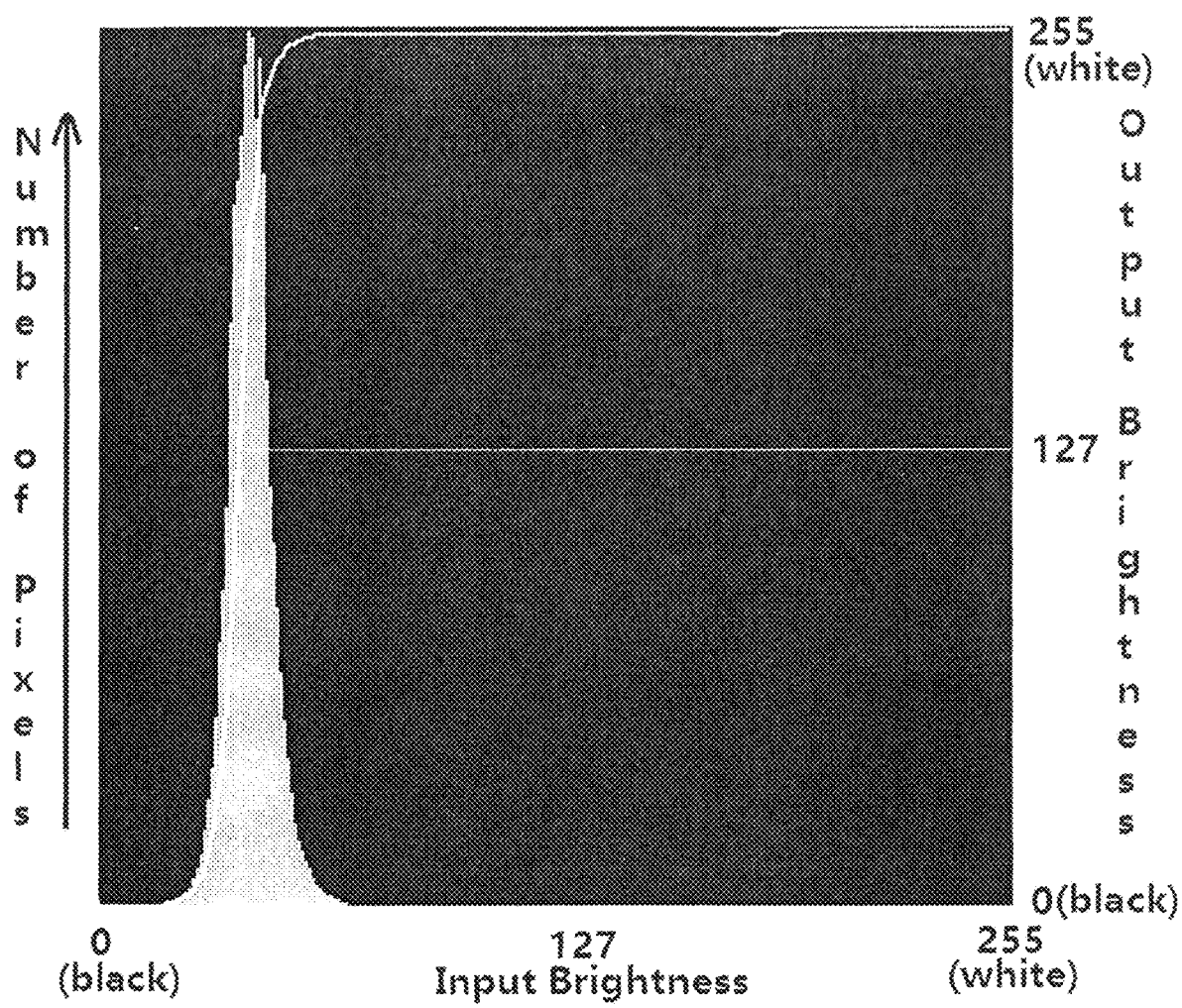
FIG. 6 is a graphic depiction of a brightness transformation curve after processing.

After the application of the histogram integration and normalization the modification of the transformation curve is shown in FIG. 6.

The integration of the histogram data can be straight forward or enhanced to provide greater amplification of the more subtle details in the image. Enhancement may involve increased weighting of histogram values when the histogram values are on the rise and/or increased weighing of darker values over light values or other integration like functions or equivalents thereof.

Pseudocode for Basic Integration:

```
accum=0.0
for i=0 to 255 {
    accum=accum+histogrram[i]
    brightnessTranformation[i]=accum
```

Pseudocode for One Example of Enhanced Integration Boosting Detail of Darker Image Features:

```
accum=0.0
lastValue=
for i=0 to 255 {
    if histogram[i]>lastValue {
        accum=accum+histogrram[i]×((255.0−i)/(i+63.0))2
    else
        accum=accum+histogrram[i]}
    brightnessTranformation[i]=accum
    lastValue=histogram[i]
```

Pseudocode for Normalization of Histogram Integration Brightness Transformation Data to a Range of 0 to 255:

```
for i=0 to 255 {
    brightnessTranformation[i]=(brightnessTranformation
        [i]−brightnessTranformation[0])/brightnessTranfor-
        mation[255]*255.0}
```

Image Transformation Step

Figure 7:
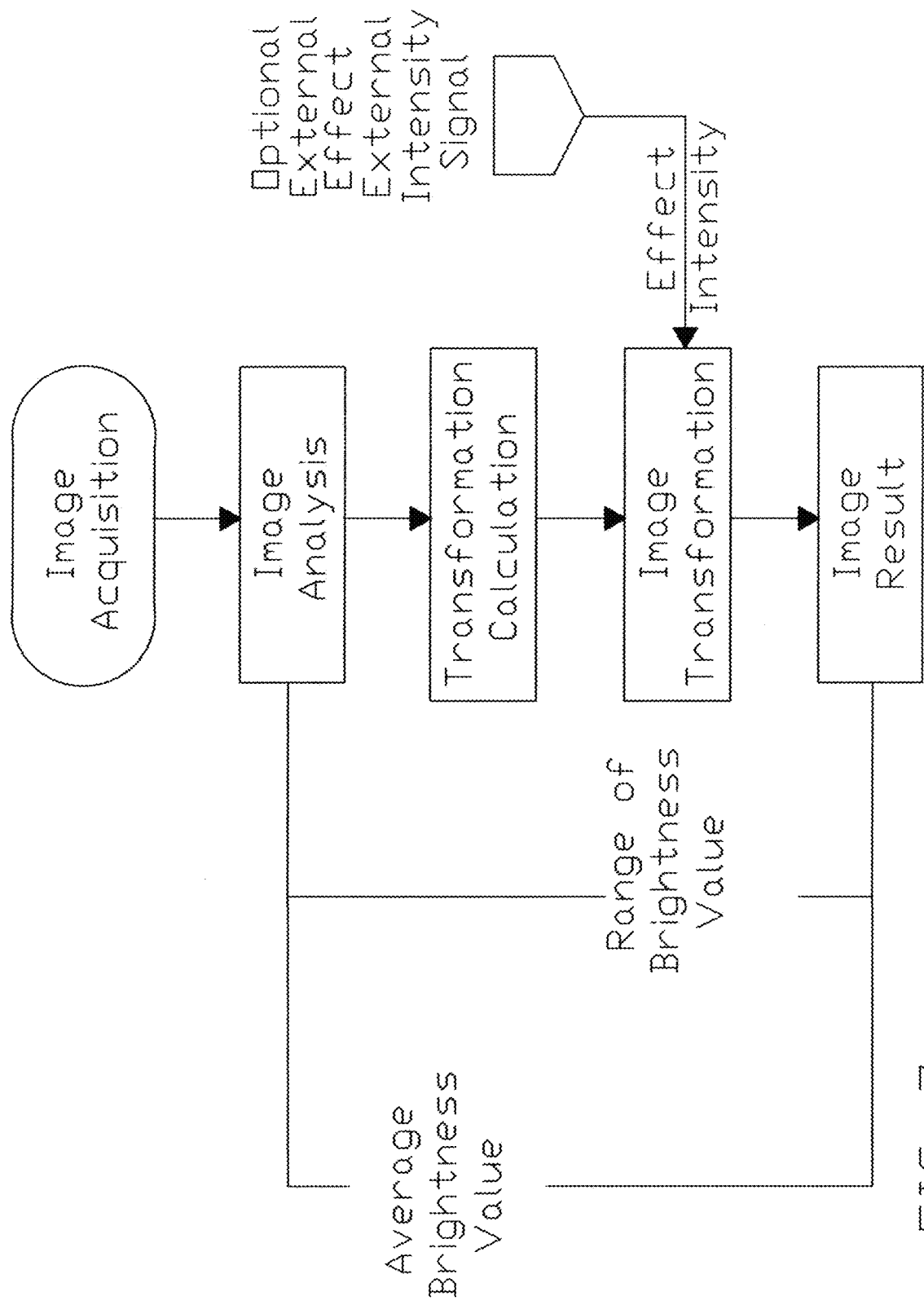
FIG. 7 is a flow diagram of the image transformation step of the present invention.
Figure 8:
FIG. 8 is an unmodified GOOGLE Earth input image depicting an underwater scenes or scape.
Figure 9:
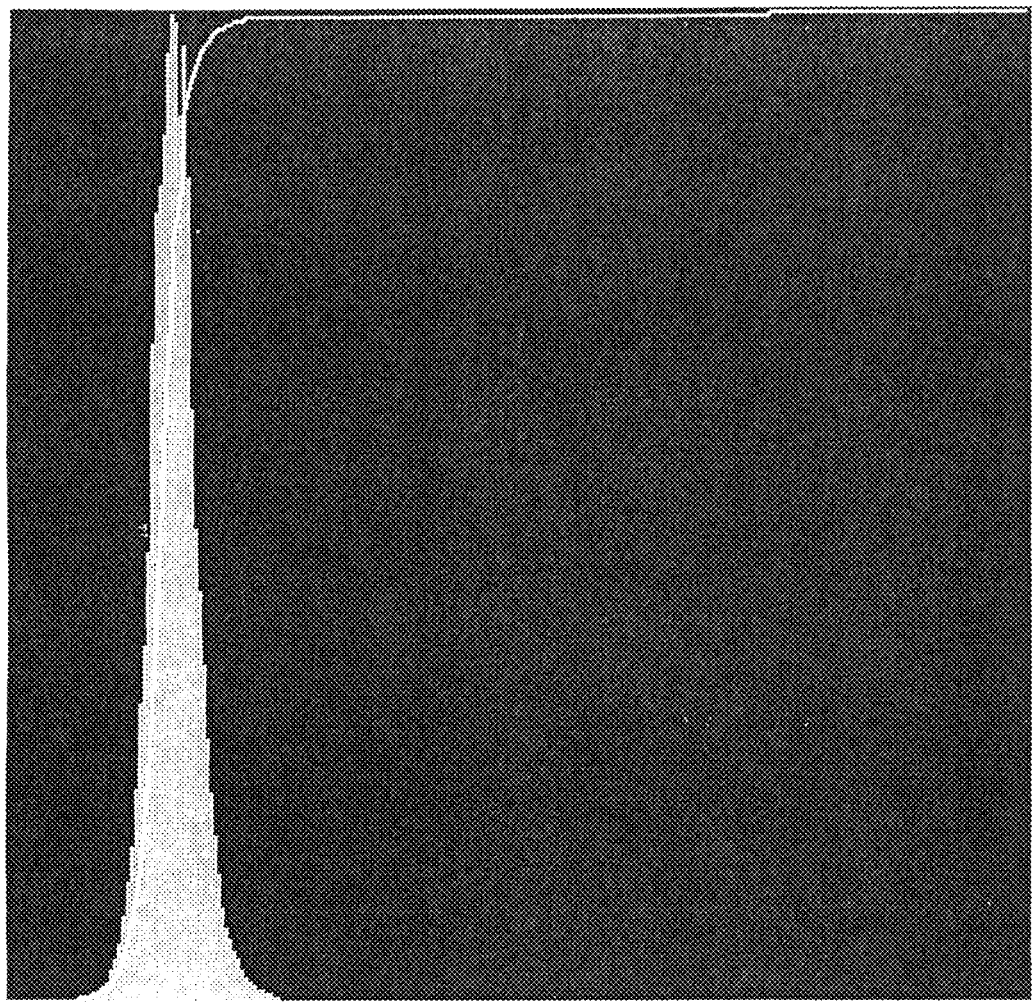
FIG. 9 depicts histograms and brightness curves of the input image of FIG. 8.
Figure 10:
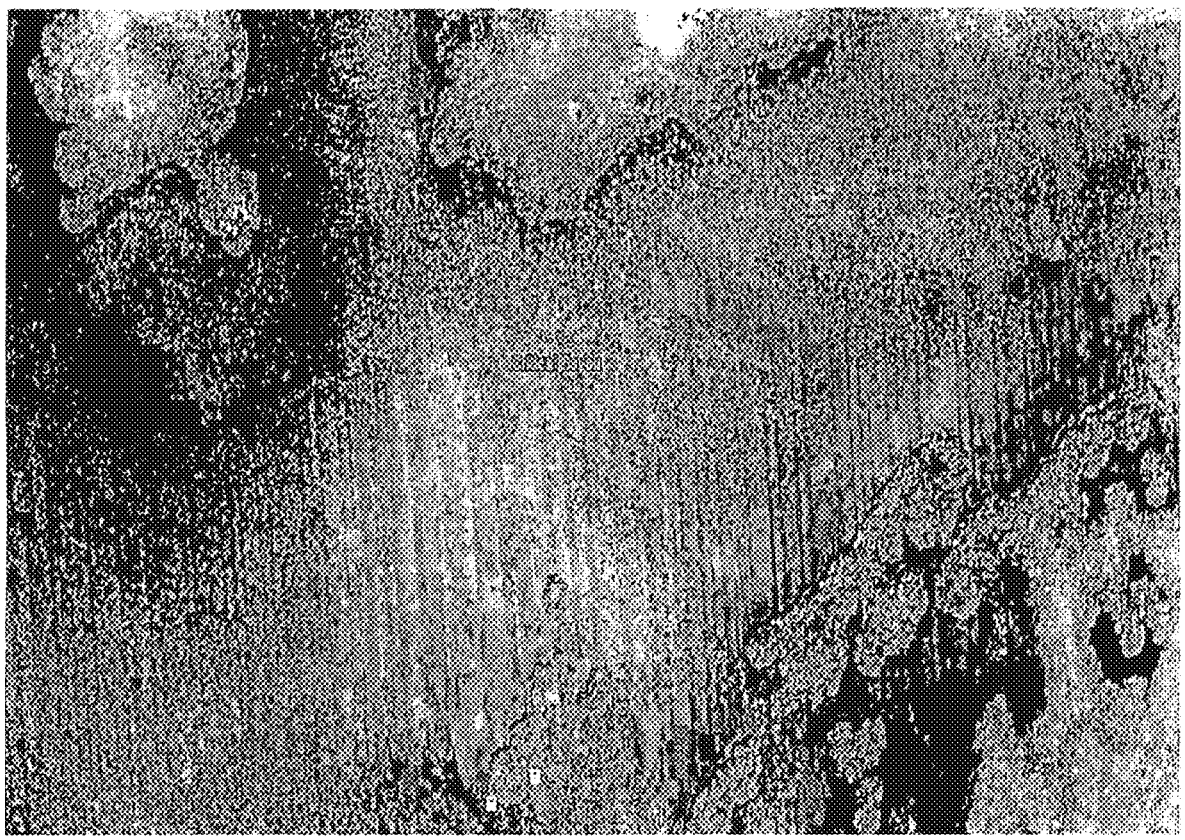
FIG. 10 depicts the modified, enhanced image from the unmodified image of FIG. 8.
Figure 11:
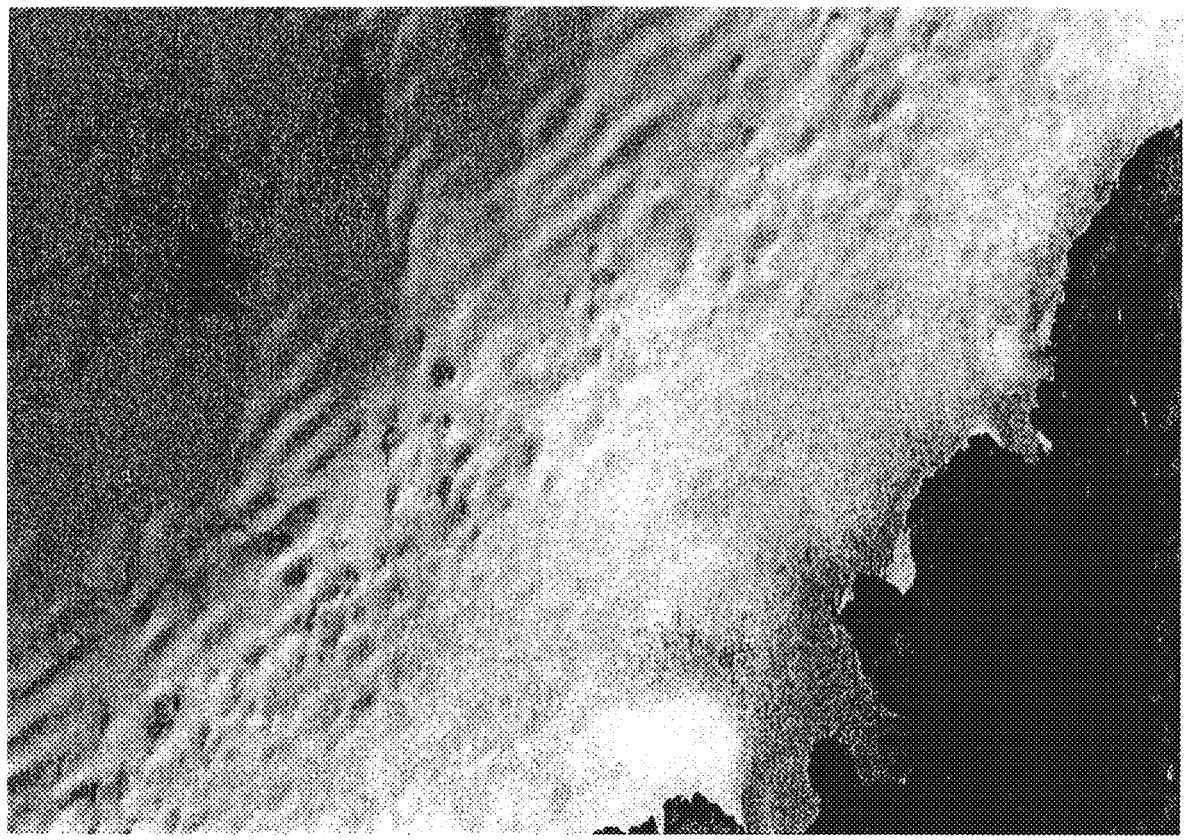
FIG. 11 is another unmodified GOOGLE Earth input image depicting an underwater scenes or scape.
Figure 12:
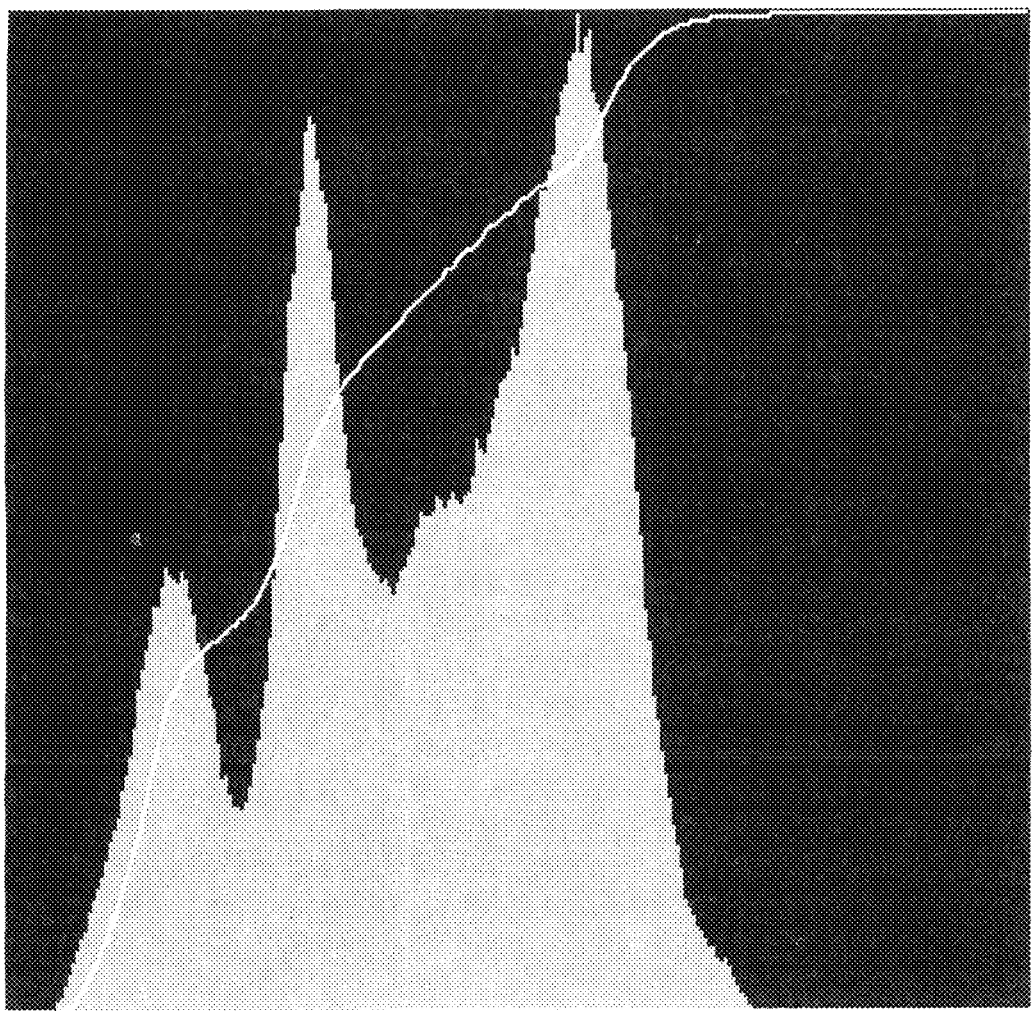
FIG. 12 depicts histograms and brightness curves of the input image of FIG. 11.
Figure 13:
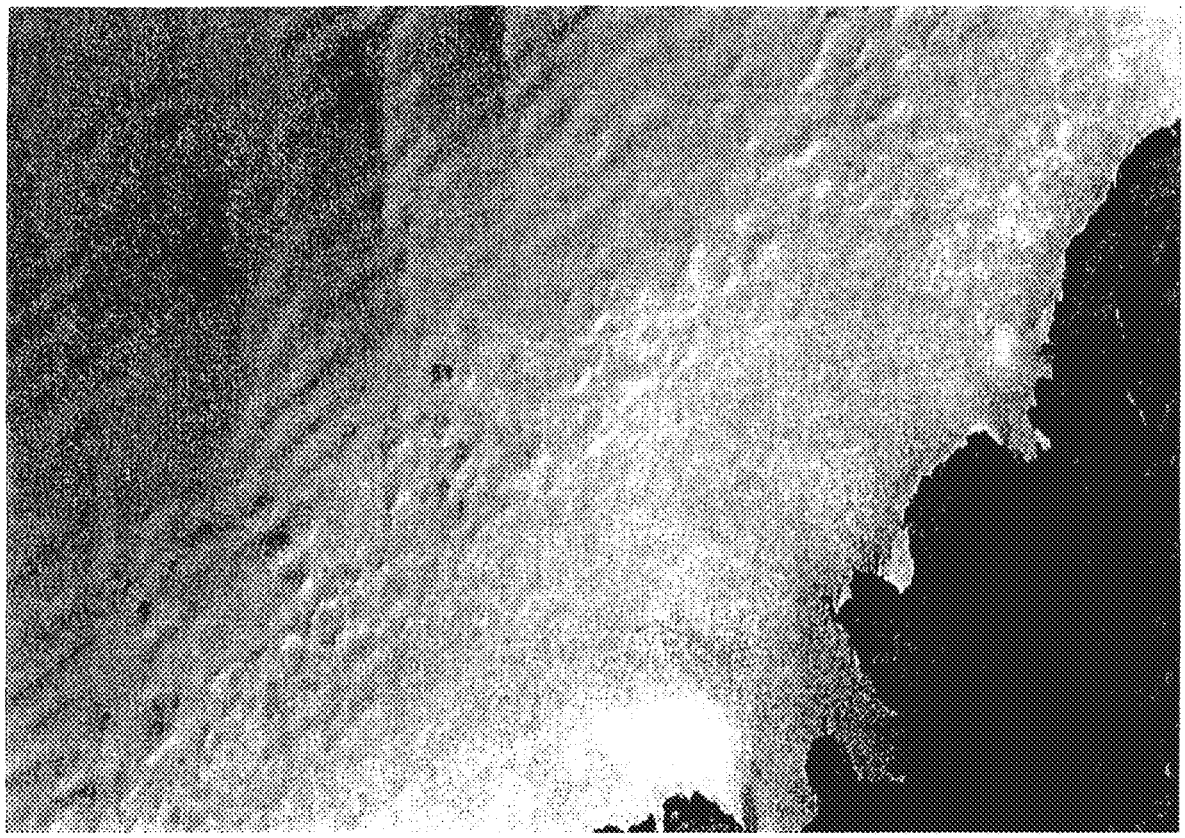
FIG. 13 depicts the modified, enhanced image from the unmodified image of FIG. 11.
Figure 14:
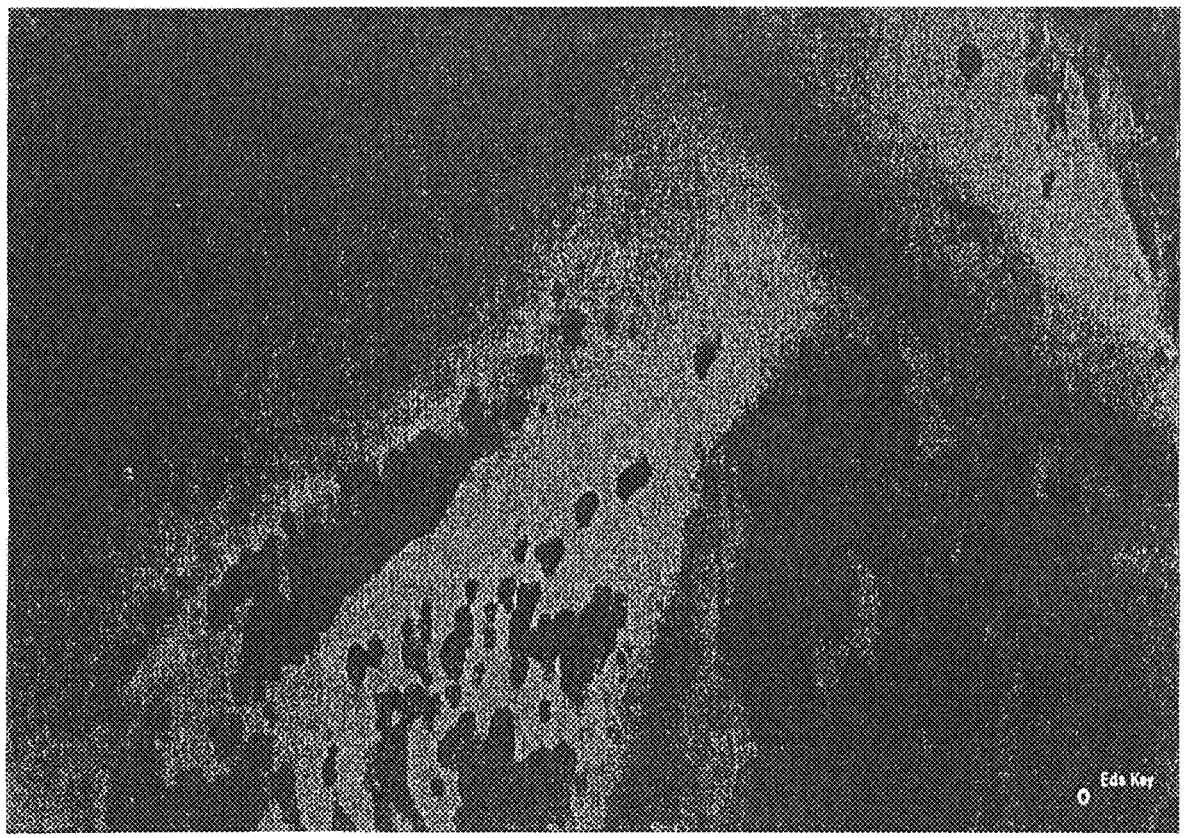
FIG. 14 is an unmodified low light input image depicting an underwater scene or scape.
Figure 15:
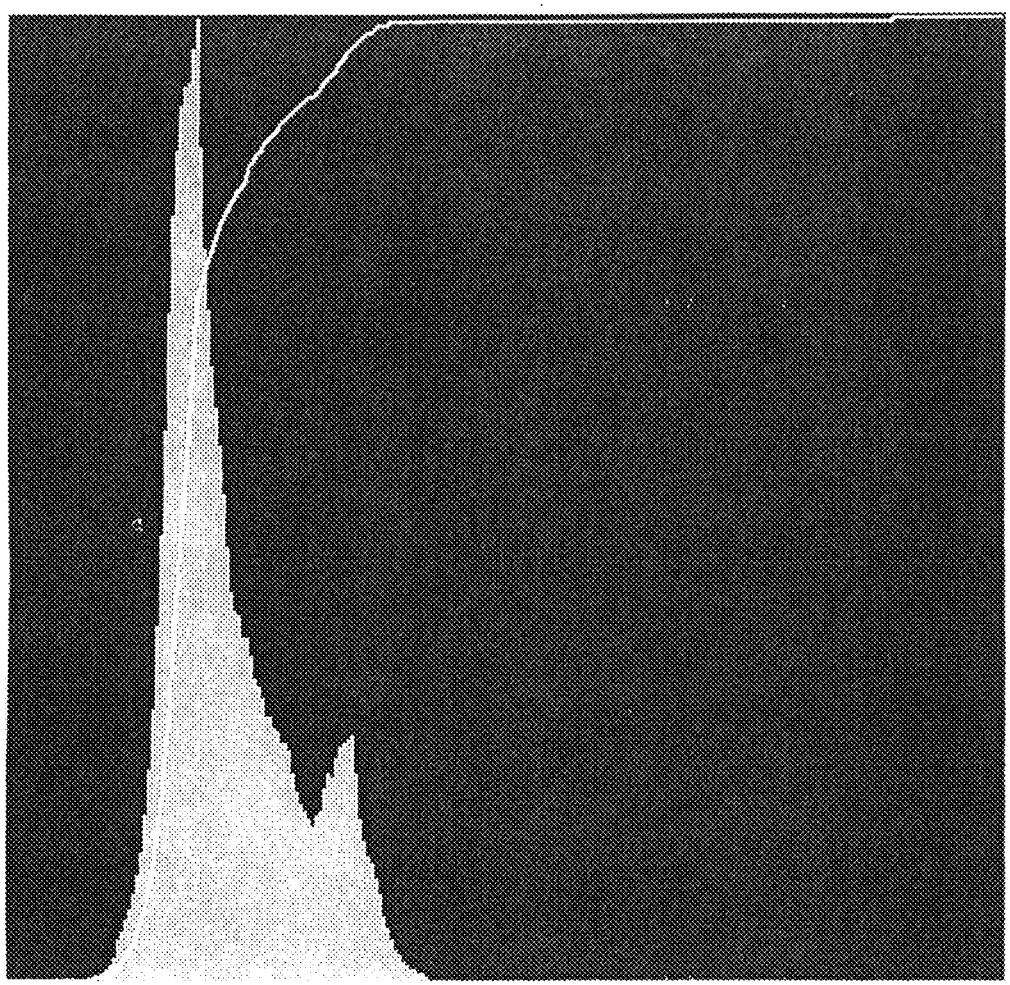
FIG. 15 depicts histograms and brightness curves of the input image of FIG. 14.
Figure 16:
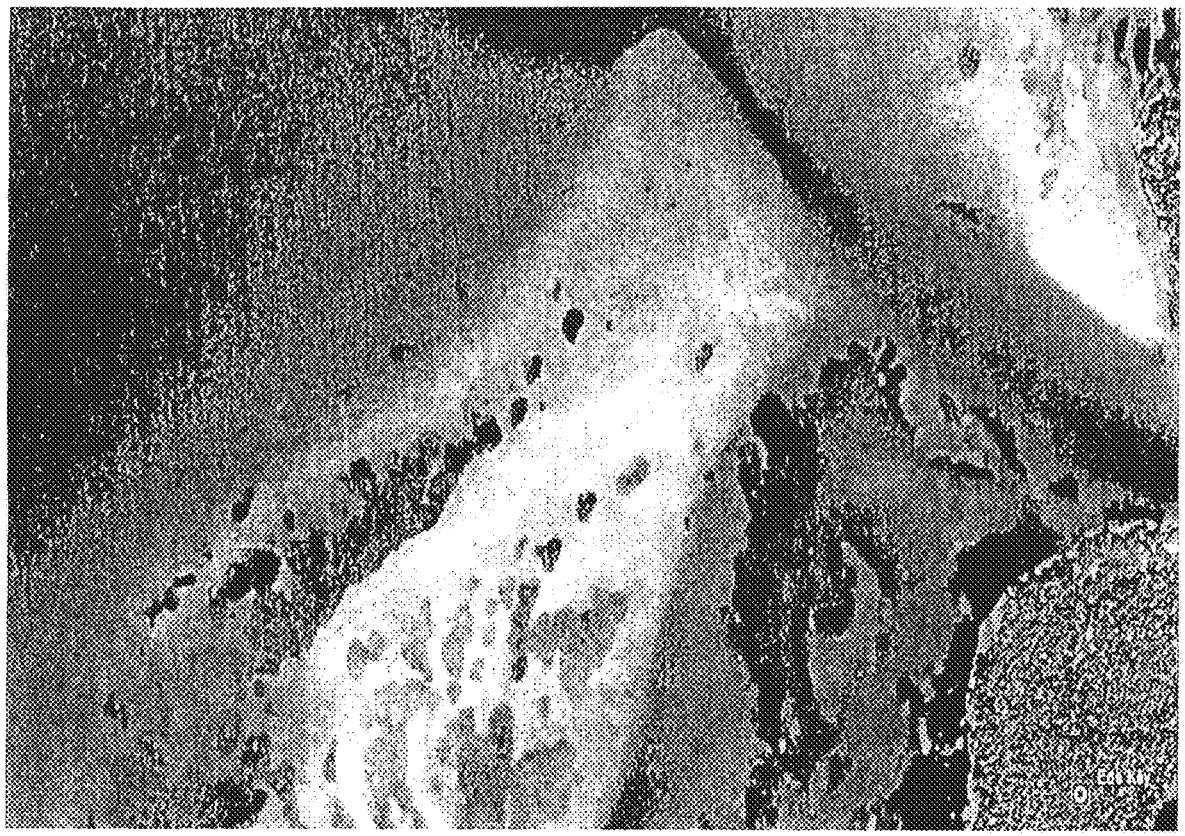
FIG. 16 depicts the modified, enhanced image from the unmodified image of FIG. 14.
Figure 17:
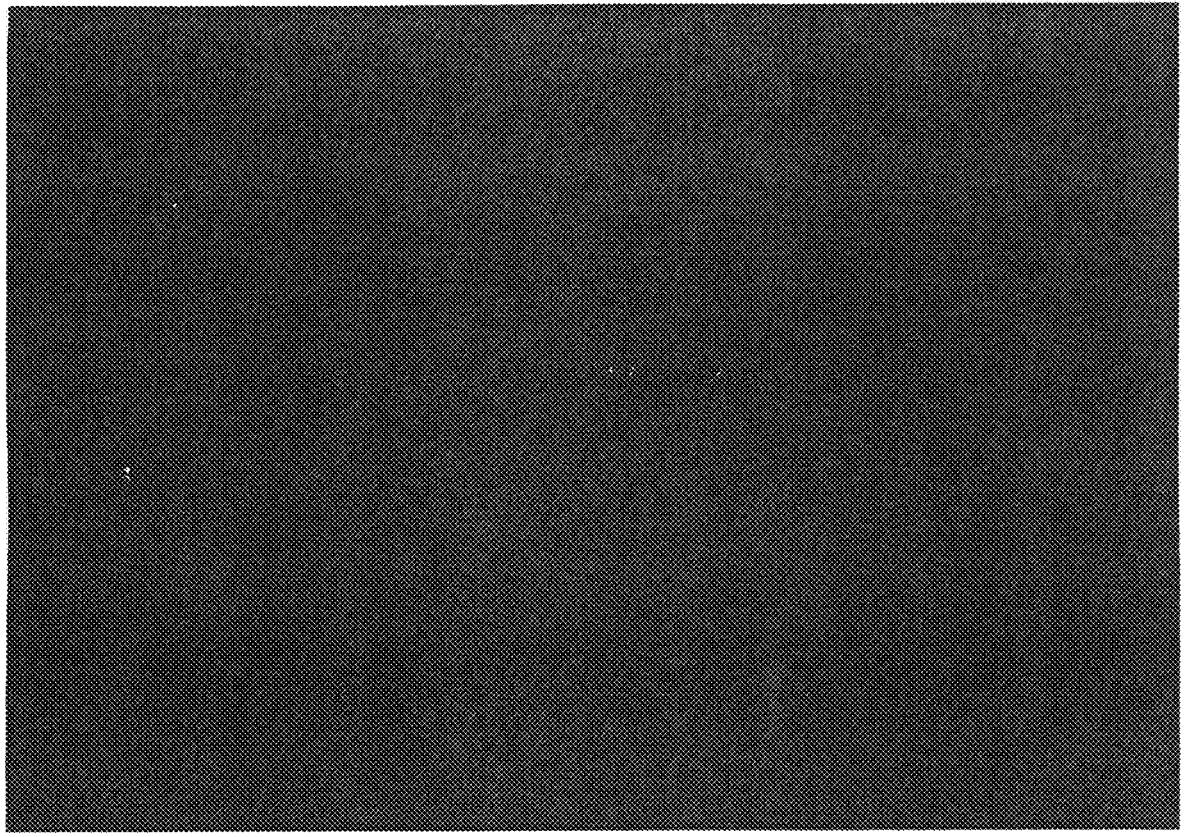
FIG. 17 is another unmodified low light input image depicting an underwater scene or scape.
Figure 18:
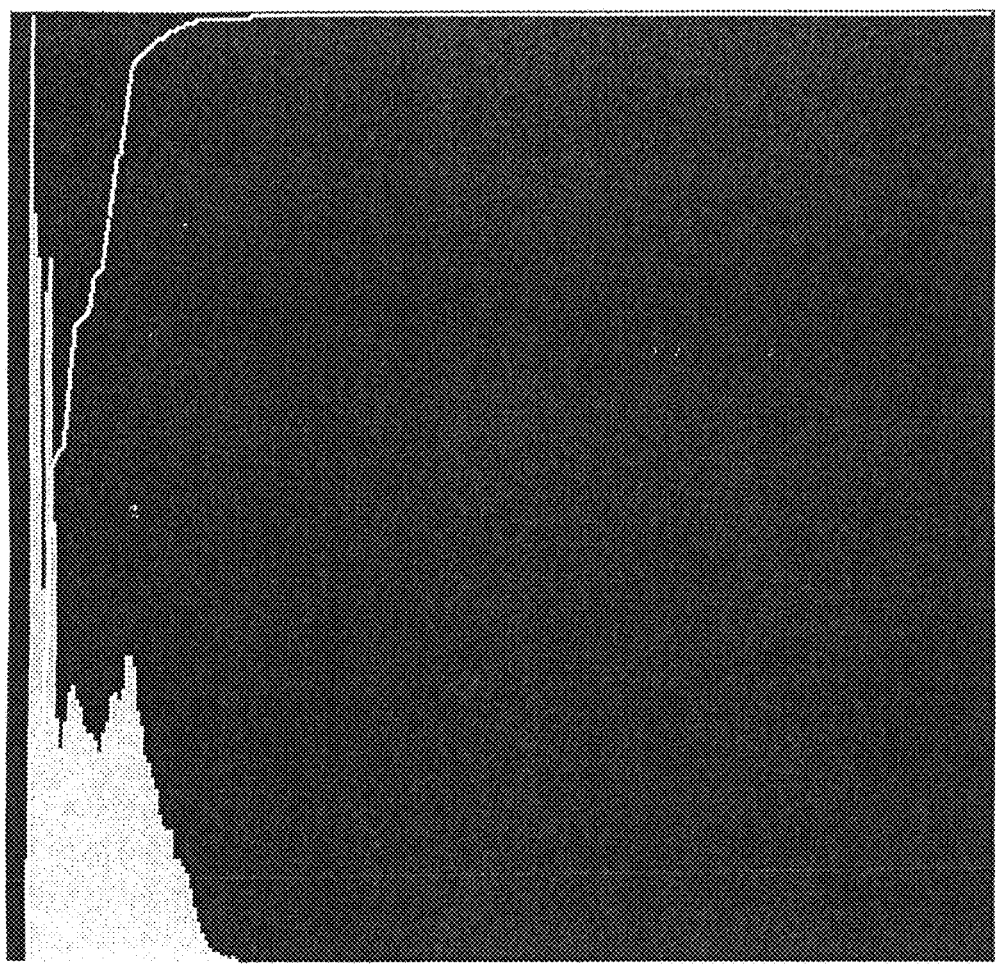
FIG. 18 depicts histograms and brightness curves of the input image of FIG. 17.
Figure 19:
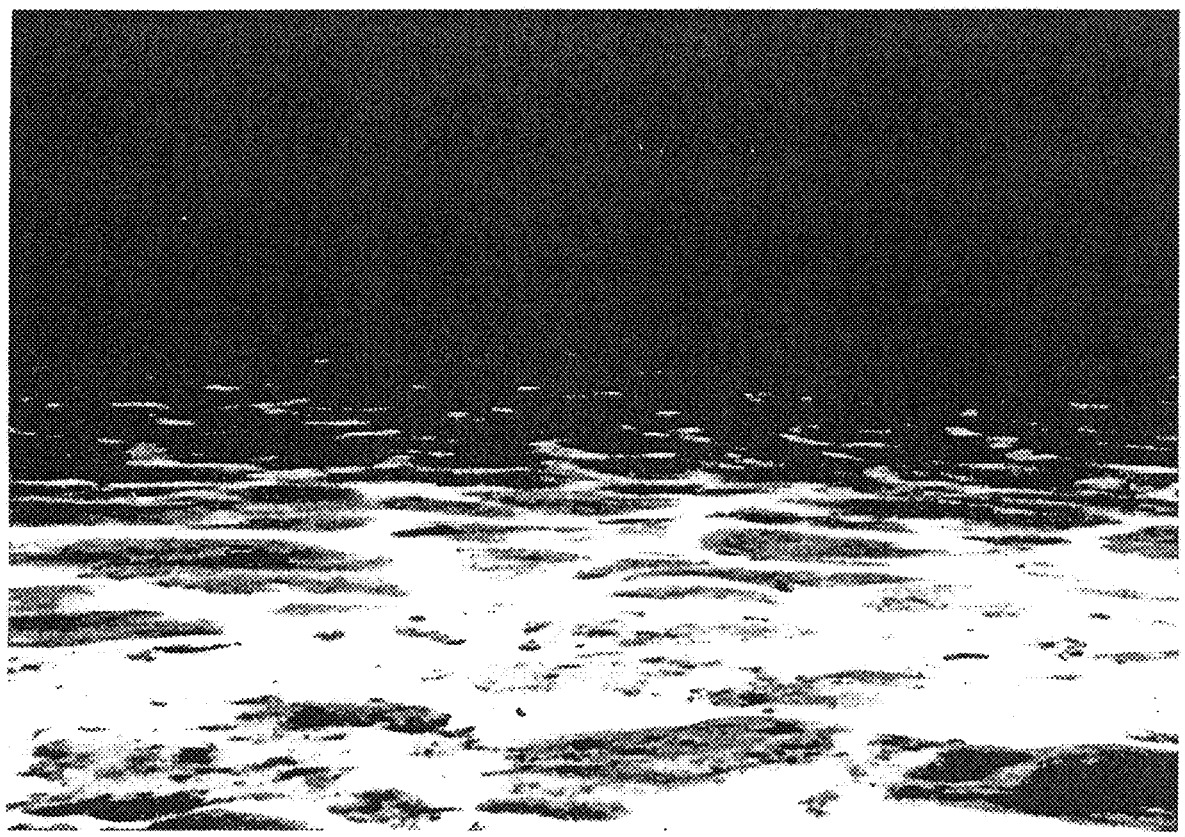
FIG. 19 depicts the modified, enhanced image from the unmodified image of FIG. 17.
Figure 20:
FIG. 20 is an unmodified low contrast input image depicting a dog.
Figure 21:
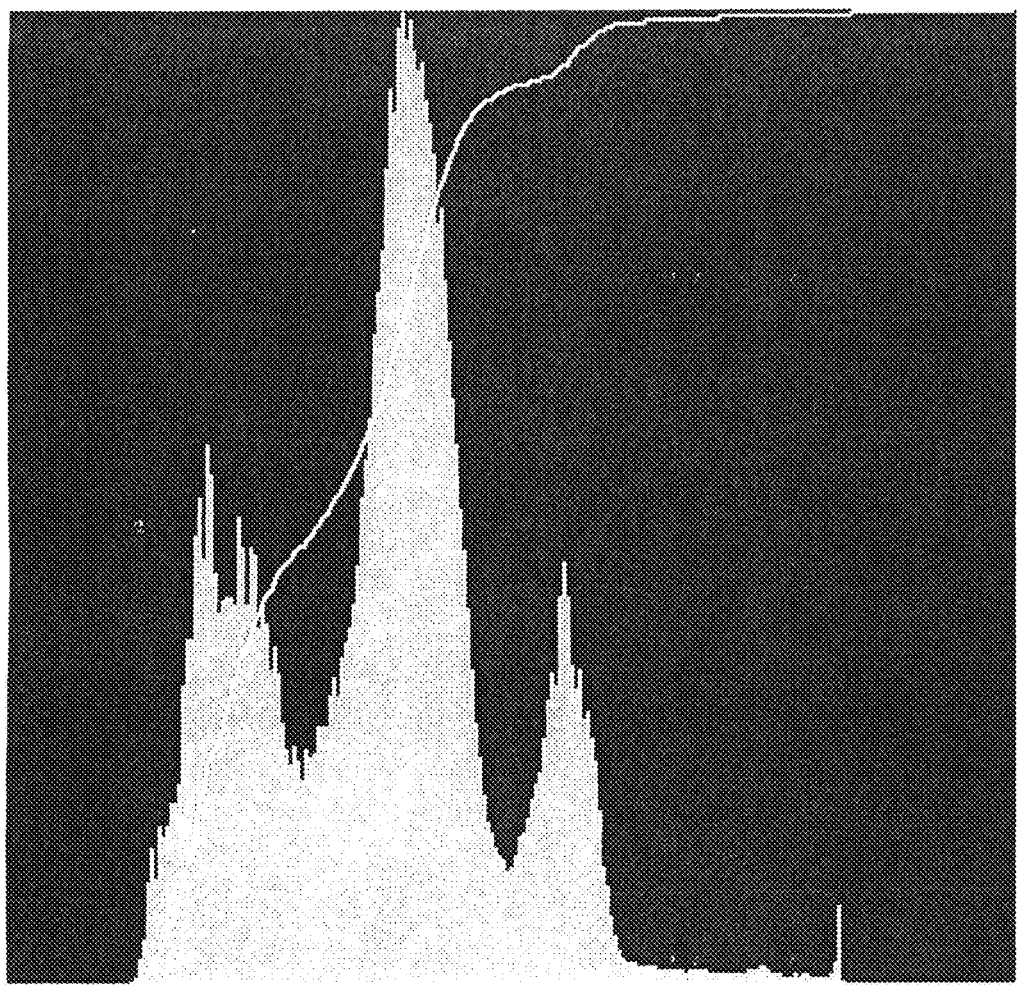
FIG. 21 depicts histograms and brightness curves of the input image of FIG. 20.
Figure 22:
FIG. 22 depicts the modified, enhanced image from the unmodified image of FIG. 20.
Figure 23:
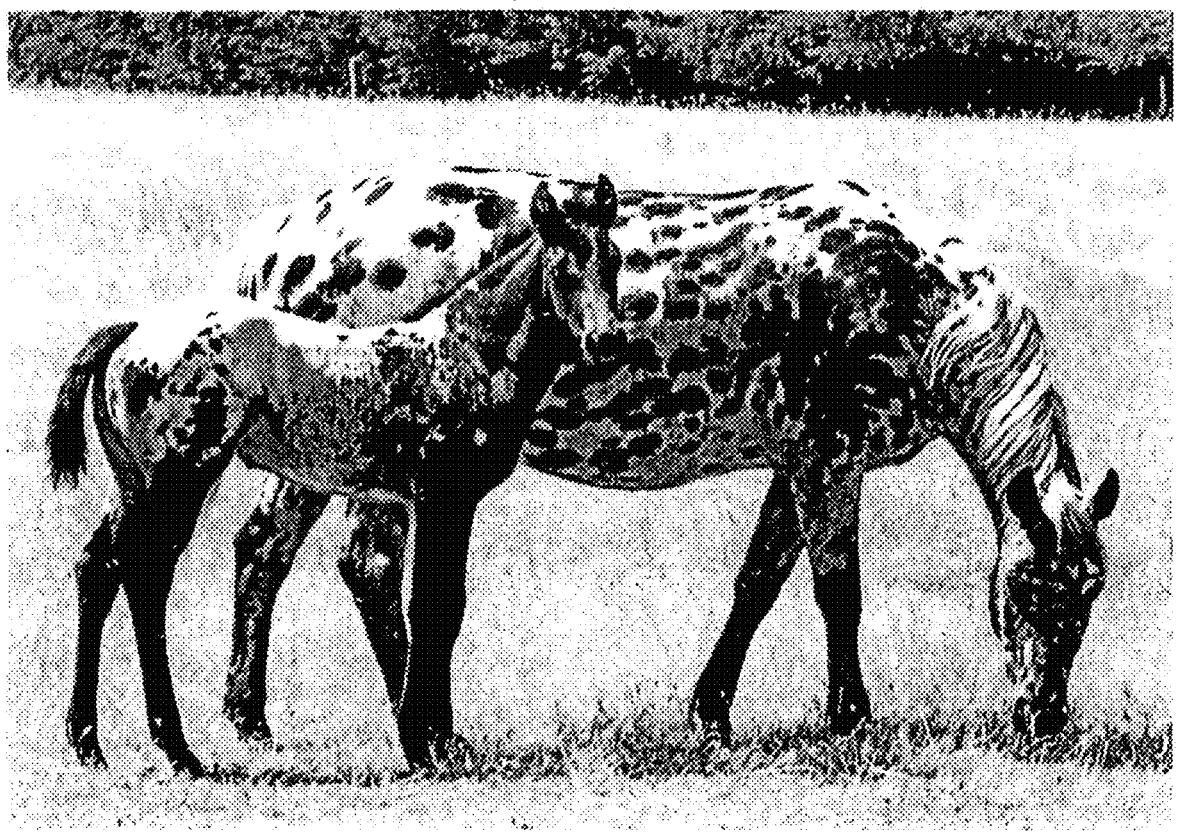
FIG. 23 is another unmodified low contrast input image depicting a pair of horses.
Figure 24:
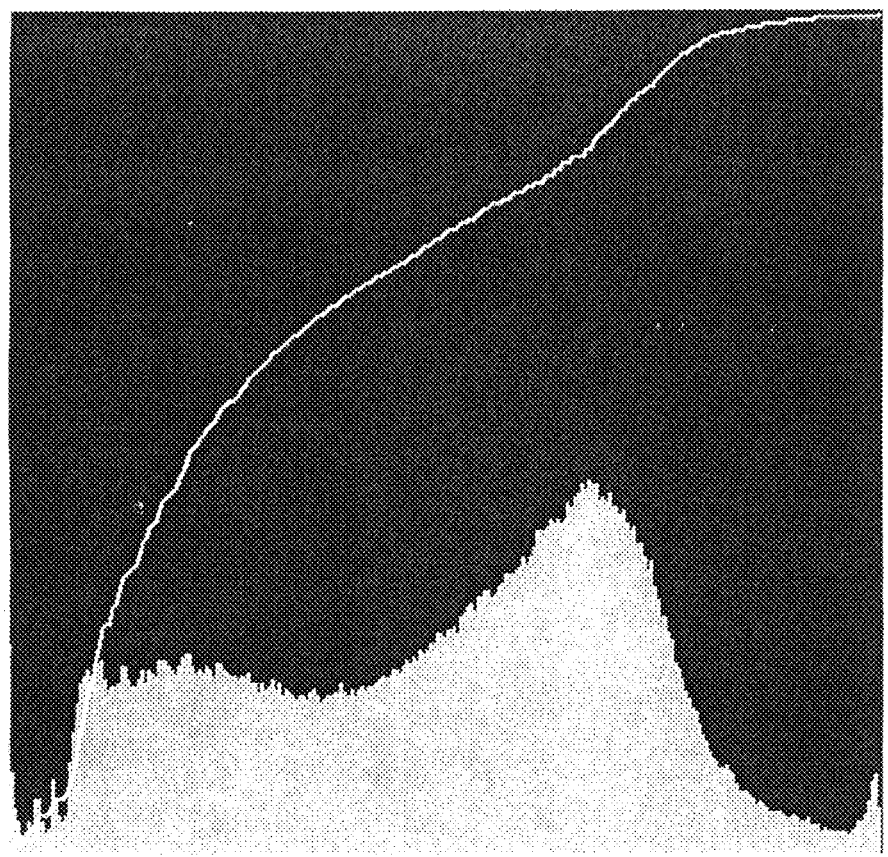
FIG. 24 depicts histograms and brightness curves of the input image of FIG. 20.
Figure 25:
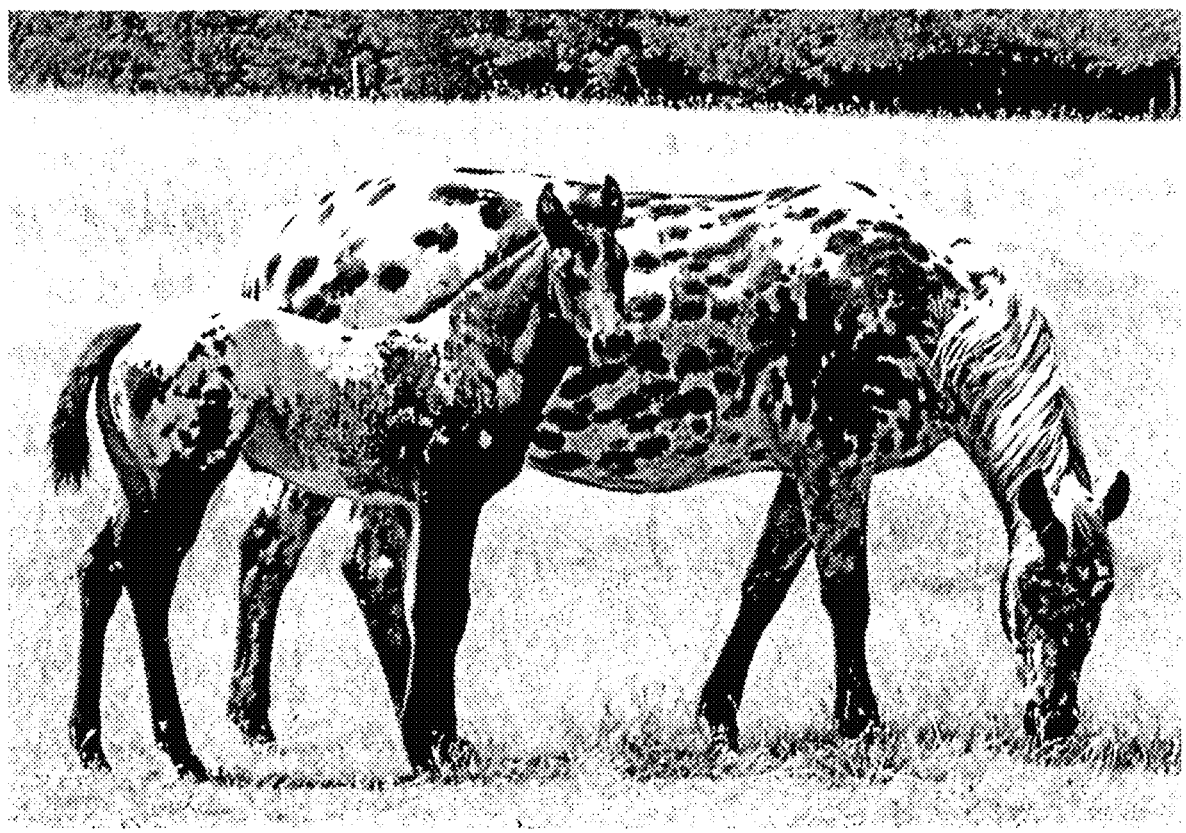
FIG. 25 depicts the modified, enhanced image from the unmodified image of FIG. 23.

This invention's image processing involves processing the object image according to the results of the Brightness Transformation, Average Brightness and Range of Brightness values derived from the object image as shown in FIG. 7.

Image Transformation is where the previous Image Analysis and Transformation Calculations are applied to the object image to produce the output image result. Each pixel is broke down into its red [R], green [G] and blue [B] intensity values, mathematically manipulated and then recombined into the new resulting pixel value. The example algorithm to follow utilizes the previous Image Analysis and Transformation Calculations to manipulate the brightness, contrast and color saturation to effect the desired result. The optional effectIntensity variable provides a means for external control of the intensity of the transformation's effect on the resulting image. It may be used to input a display device ambient light sensor to extend the effective display power beyond the display's native physical limitation in response to lighting conditions. The nominal value for full effect in this example is 100. A value of 0 results in no effect leaving the image unaltered. The value is continuously variable and open ended and can be thought of as a percent where 150 represents 150% effect, for example.

Pseudocode for Image Transformation utilizing Image Analysis and Transformation Calculations Data:

```
effectFactor=effectIntensity*(0.000075−(rangeOfBrigh-
    ness/255.0)*0.00004);
brightnessFactor=((255.0−rangeOfBrighness)/191.0+
    3.0−averageBrightness/73.0)/255.0
saturationFactor=(averageBrightness/63.0)/(rangeOf-
    Brighness/47.0)
if (saturationFactor>0.9) saturationFactor=0.9
for j=0 to imageWidth {
    for k=0 to imageHeight {
        R=pixel[j,k]·red
        G=pixel[j,k]·green
        B=pixel[j,k]·blue
        factor0=brightnessTransformation[brightness[j,k]]
``` factor1=factor0×brightnessFactor
factor2=|factor0−brightness[j,k]|*effectFactor
factor3=1.0−factor2
adjustedR=factor2×(factor1×R+R−(G+B)×saturationFactor)+factor3×R
adjustedG=factor2×(factor1×G+G−(B+R)×saturationFactor)+factor3×G
adjustedB=factor2×((factor1×B+B−(R+G)×saturationFactor)+factor3×B
if (adjustedR>255.0) adjustedR=255.0 else if (adjustedR<0.0) adjustedR=0.0
if (adjustedG>255.0) adjustedG=255.0 else if (adjustedG<0.0) adjustedG=0.0
if (adjustedB>255.0) adjustedB=255.0 else if (adjustedB<0.0) adjustedB=0.0
pixel[j,k]·red=adjustedR
pixel[j,k]·green=adjustedG
pixel[j,k]·blue=adjustedB}

Image Processing Examples

Six (6) examples of original input images, corresponding histograms and brightness transformation curves and resulting processed images are shown. In all examples this invention's effect is set at 100% with no manual adjustments introduced from image to image demonstrating its adaptive nature.

What is claimed is:

1. An image processing system to improve the clarity of object images to be displayed on a display console assembly as display images operatively coupled to a micro-controller and circuitry:
    wherein said display console comprises an LCD display screen and back-light source including a plurality of LEDs coupled and ambient light sensor;
    wherein said micro-controller and circuitry includes means to selectively control the amount of back-light fed to said LCD display screen to control the brightness of said LCD display screen in a high ambient light environment by increasing the brightness of object images displayed as corresponding display images on said LCD display screen and
    wherein said micro-controller and circuitry includes means to process said object images by image analysis, transformation calculation and image transformation to enhance the clarity of object images to be displayed as corresponding display images; and
    wherein said image analysis comprises the derivation of image characteristics of the object images including:
    image grey scale values including brightness, perceived brightness and luminance;
    image grey scale frequency histogram;
    image average brightness;
    image range of brightness; and
    wherein said range of brightness is derived using a threshold of range values calculated from pixels occurring a predetermined minimum number of times in the object image and dividing the pixels into at least two groups of greater brightness than the image average brightness and those of lesser brightness then using the average brightness of each of said two groups as the minimum and maximum values.

2. The image processing system of claim 1 wherein said image grey scale values for each pixel of the object image are calculated using:
    Numerical Brightness: I=(R+G+B)/3 where R, G and B represent the values of the intensity of the colors; Red, Green, and Blue of the pixel and I represent brightness as the numerical average of the three colors.

3. The image processing system of claim 1 wherein said image grey scale values for each pixel of the object image are calculated using:
    Perceived Brightness: I=0.299 R+0.587×G+0.114×B where R, G and B represent the values of the intensity of the colors; Red, Green and Blue of the pixel and I represent brightness as the human perceptually weighted average of the three colors.

4. The image processing system of claim 1 wherein said image grey scale values for each pixel of the object image are calculated using:
    Luminance: Involves a method of transforming RGB values into Hue, Saturation, and Lightness (HSL) values using L as the gray scale value such that I=L.

5. The image processing system of claim 1 said grey scale frequency histogram comprises a statistical representation of the distribution of said image grey scale values as the number of pixels or sample points that fall within into a range of predefined values.

6. The image processing system of claim 1 wherein said image average brightness is calculated by converting each of image pixel value to grey scale brightness and calculating the arithmetic mean.

7. The image processing system of claim 1 wherein said image range of brightness comprises a measure of brightness extremes of each said object image.

8. The image processing system of claim 7 wherein said image range of brightness is calculated from pixels occurring a predetermined number of times in each said object image.

9. The image processing system of claim 1 wherein said transformation calculation maps image tonality adjustments and alters the transformation curve to maximize detail in the brightness regions that contain the majority of detail while maintaining the full dynamic range of the object image such that the transformation curve is steep through the regions of highest histogramic brightness frequency density by integrating the histogram and normalizing the resultant values to the brightness transformation range.

10. The image processing system of claim 9 wherein said image transformation comprises transformation calculations applied to each said object image to produce each said corresponding display image wherein each pixel is separated into red [R], green [G] and blue [B] intensity values, mathematically manipulated and then recombined resulting pixel value utilize said previous image analysis and transformation calculations to adjust the brightness, contrast and color saturation to enhance object image clarity.

11. The image processing system of claim 1 wherein said range of brightness is calculated as:
    accumMin=0, countMin=0, accumMax=0, countMax=0
    for j=0 to imageWidth {
        for k=0 to imageHeight
            if brightness[j,k]<averageBrightness then
                accumMin=accumMin+brightness[j,k]
                countMin=countMin+1
            else if brightness[j,k]>averageBrightness then
                accumMax=accumMax+brightness[j,k]
                countMax=countMax+1}
    if countMax>0 and countMin>0 then
        result=accumMax/countMax−accumMin/countMin
        else
        result=0.

12. The image processing system of claim 1 wherein the average brightness is calculated by converting each of the target image pixel values to grey scale brightness and calculating the arithmetic mean.

13. The image processing system of claim 1 wherein said image average brightness is derived calculating:
accumulatedBrightness=0
for j=0 to imageWidth
  for k=0 to imageHeight
    accumulatedBrightness=accumulatedBrightness+(pixel[j,k]·red+pixel[j,k]·green+pixel[j,k]·blue)/3}
result=accumulatedBrightness/(imageWidth*imageHeight).

14. The image processing system of claim 1 wherein said image grey scale frequency histogram uses numerical brightness and 256 bins on a 24-bit depth image is calibrated as:
array histogramBin[256]
for j=0 to imageWidth {
  for k=0 to imageHeight {
    brightness=(pixel[j,k]·red+pixel[j,k]·green+pixel[j,k]·blue)/3
    histogramBin[brightness]=histogramBin[brightness]+1.

15. An image processing system to improve the clarity of object images to be displayed on a display console assembly as display images operatively coupled to a micro-controller and circuitry:
wherein said display console comprises an LCD display screen and back-light source including a plurality of LEDs coupled and ambient light sensor;
wherein said micro-controller and circuitry includes means to selectively control the amount of back-light fed to said LCD display screen to control the brightness of said LCD display screen in a high ambient light environment by increasing the brightness of object images displayed as corresponding display images on said LCD display screen and
wherein said micro-controller and circuitry includes means to process said object images by image analysis, transformation calculation and image transformation to enhance the clarity of object images to be displayed as corresponding display images; and
wherein said image analysis comprises the derivation of image characteristics of the object images including:
image grey scale values including brightness, perceived brightness and luminance;
image grey scale frequency histogram;
image average brightness;
image range of brightness; and
wherein normalization of histogram integration brightness transformation calculations to a range of 0 to 255:
for i=0 to 255{
  brightnessTranformation[i]=(brightnessTranformation[i]−brightnessTranformation[0])/brightnessTranformation[255]* 255.

16. An image processing system to improve the clarity of object images to be displayed on a display console assembly as display images operatively coupled to a micro-controller and circuitry:
wherein said display console comprises an LCD display screen and back-light source including a plurality of LEDs coupled and ambient light sensor;
wherein said micro-controller and circuitry includes means to selectively control the amount of back-light fed to said LCD display screen to control the brightness of said LCD display screen in a high ambient light environment by increasing the brightness of object images displayed as corresponding display images on said LCD display screen;
wherein said micro-controller and circuitry includes means to process said object images by image analysis, transformation calculation and image transformation to enhance the clarity of object images to be displayed as corresponding display images; and
wherein said image analysis comprises the derivation of image characteristics of the object images including:
image grey scale values including brightness, perceived brightness and luminance;
image grey scale frequency histogram;
image average brightness;
image range of brightness; and
wherein said image transformation utilizing image analysis and transformation calculations comprises:
effectFactor=effectIntensity*(0.000075−(rangeOfBrighness/255.0)*0.00004);
brightnessFactor=((255.0−rangeOfBrighness)/191.0+3.0−averageBrightness/73.0)/255.0
saturationFactor=(averageBrightness/63.0)/(rangeOfBrighness/47.0)
if (saturationFactor>0.9) saturationFactor=0.9
for j=0 to imageWidth {
  for k=0 to imageHeight {
    R=pixel[j,k]·red
    G=pixel[j,k]·green
    B=pixel[j,k]·blue
    factor0=brightnessTransformation[brightness[j,k]]
    factor1=factor0×brightnessFactor
    factor2=|factor0−brightness[j,k]|*effectFactor
    factor3=1.0−factor2
    adjustedR=factor2×(factor1×R+R−(G+B)×saturationFactor)+factor3×R
    adjustedG=factor2×(factor1×G+G−(B+R)×saturationFactor)+factor3×G
    adjustedB=factor2×((factor1×B+B−(R+G)×saturationFactor)+factor3×B
    if (adjustedR>255.0) adjustedR=255.0 else if (adjustedR<0.0) adjustedR=0.0
    if (adjustedG>255.0) adjustedG=255.0 else if (adjustedG<0.0) adjustedG=0.0
    if (adjustedB>255.0) adjustedB=255.0 else if (adjustedB<0.0) adjustedB=0.0
    pixel[j,k]·red=adjustedR
    pixel[j,k]·green=adjustedG
    pixel[j,k]·blue=adjustedB).

\* \* \* \* \*